United States Patent
Stemke

(10) Patent No.: US 6,699,422 B1
(45) Date of Patent: Mar. 2, 2004

(54) SHAPING METHOD FOR PRODUCING PLASTIC PARTS AND DEVICE FOR CARRYING OUT SAID METHOD

(76) Inventor: Lothar Stemke, Waldheimer Strasse 1, D-04720 Döbeln (DE)

( * ) Notice: Subject to any disclaimer, the term of this patent is extended or adjusted under 35 U.S.C. 154(b) by 0 days.

(21) Appl. No.: 09/830,724

(22) PCT Filed: Oct. 27, 1999

(86) PCT No.: PCT/EP99/08098

§ 371 (c)(1),
(2), (4) Date: Apr. 27, 2001

(87) PCT Pub. No.: WO00/24560

PCT Pub. Date: May 4, 2000

(30) Foreign Application Priority Data

Oct. 28, 1998 (DE) .......................... 198 49 452
Jun. 9, 1999 (DE) .......................... 199 26 319
Oct. 13, 1999 (DE) .......................... 199 49 427

(51) Int. Cl.[7] .......................... B29C 45/02; B29C 43/36
(52) U.S. Cl. .......................... 264/328.4; 264/328.19; 425/566; 425/571
(58) Field of Search .......................... 264/328.1, 328.4, 264/328.19; 425/544, DIG. 227, 571, 566

(56) References Cited

U.S. PATENT DOCUMENTS

| 2,505,540 | A | * | 4/1950 | Goldhard | .................... 425/145 |
| 3,590,114 | A | | 6/1971 | Uhlig | |
| 3,647,337 | A | | 3/1972 | Dega | |
| 4,080,147 | A | * | 3/1978 | Dumortier | .................. 425/551 |
| 4,560,342 | A | * | 12/1985 | Ishida et al. | ................. 425/562 |
| 5,310,330 | A | * | 5/1994 | Zweig et al. | ................ 425/116 |
| 5,449,485 | A | * | 9/1995 | Goris et al. | .............. 264/328.6 |
| 6,103,150 | A | * | 8/2000 | McDougall | ................ 264/40.4 |

FOREIGN PATENT DOCUMENTS

| DE | 196 31 209 | 10/1997 |
| EP | 0 510 414 | 10/1992 |
| WO | WO 98/09786 | 3/1998 |

OTHER PUBLICATIONS

"Einführung in die Technologie der Kunststoffe [Introduction into the Technology of Plastics]" Dipl.–Ing. Hans Domininghaus.

* cited by examiner

Primary Examiner—Jill L. Heitbrink
(74) Attorney, Agent, or Firm—Collard & Roe, P.C.

(57) ABSTRACT

The invention relates to compression injection plastic molding using a repository space, for the temporary storage of the molding material melt to prevent structural faults and reduce workpiece costs. The molten molding material is first fed into the repository space, whose volume corresponds to the volume of the mold cavity. When the injection process starts, the bottom of the piston aligns with the edge of the repository space and with the wall of the mold cavity so that a small amount of molding material melt reaches the mold cavity directly. The piston then slides into the cylinder. The repository space, which continuously becomes larger, is filled with a melted material at almost no pressure. The melt is conveyed into the plastic core until tho supply of the melted molding material is ended. The piston is then retracted, and the mold cavity is thus completely filled with molding material.

20 Claims, 3 Drawing Sheets

Figure 1:
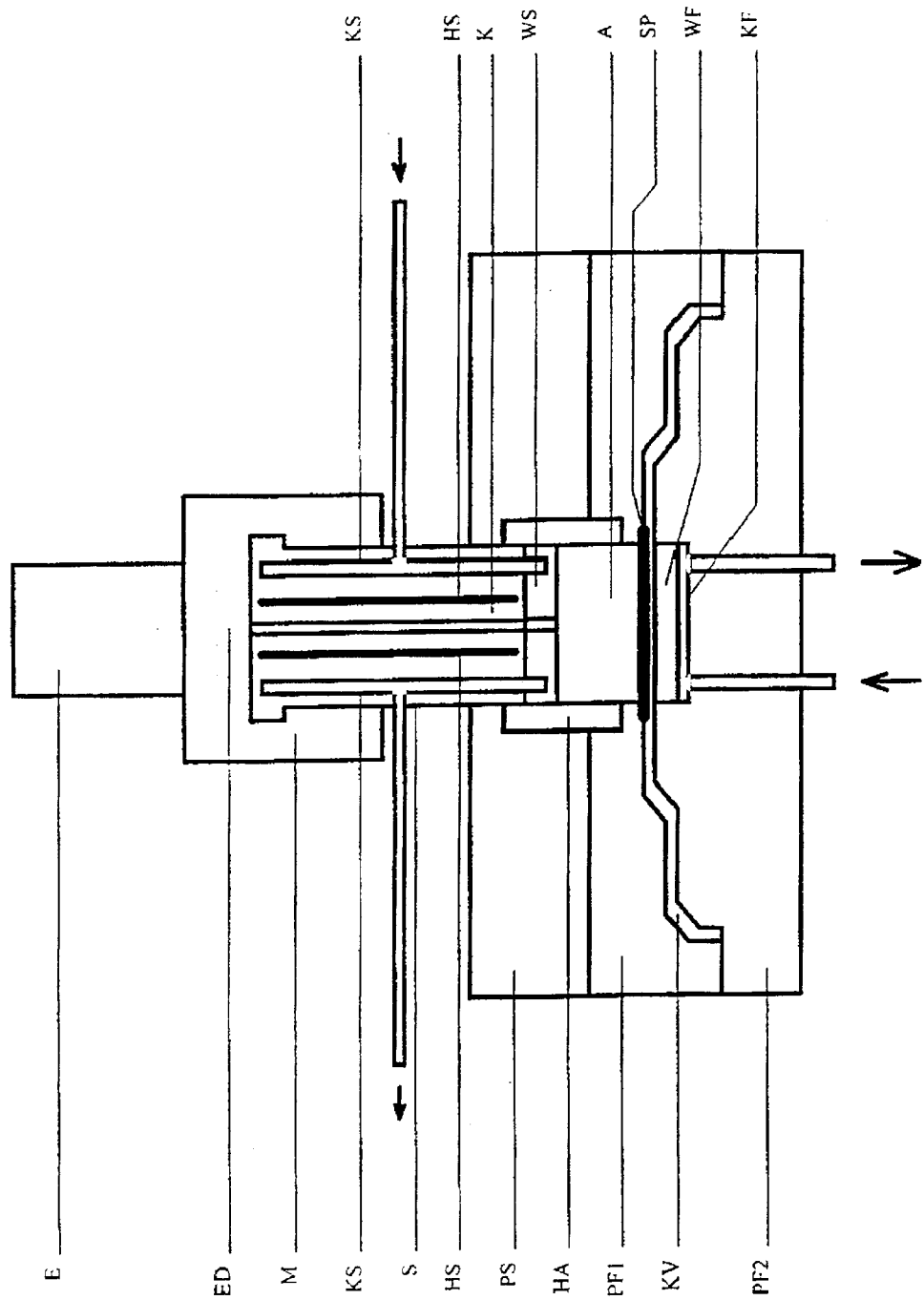

SHAPING METHOD FOR PRODUCING PLASTIC PARTS AND DEVICE FOR CARRYING OUT SAID METHOD

CROSS REFERENCE TO RELATED APPLICATIONS

Applicant claims priority under 35 U.S.C. § 119 of German Application Nos. 198 49 452.1, 199 26 319.1 and 199 49 427.4 filed Oct. 28, 1998, Jun. 9, 1999 and Oct. 13, 1999, respectively. Applicant also claims priority under 35 U.S.C. § 120 of PCT/EP99/08098 filed Oct. 27, 1999. The international application under PCT article 21(2) was not published in English.

The invention concerns the field of molding of plastic parts with compression injection molding using a repository space which communicates with the mold for temporary storage of the molding material melt.

The fabrication of plastic semimanufactured products such as granulates or similar materials is performed by preparing a melt and then pressing it in a mold at high-pressure, cooling the mass, and ejecting the molded part after the mold is opened. The pressures required for this are an important criterion for the constructive implementation of the machines and molds, above all in regard to the locking pressures obtaining. Therefore, injection molding technology has very high demands in this connection if surface-structured workpieces, such as those which require sharp-edged filling, are to be manufactured. To reduce the process pressure, solutions are known in which the material melts are fed into a repository space before the actual injection and are transferred from this repository space into the mold. Thus, the German patent application DE 196 31 209 A1 describes a process and a device for injection molding of plastic parts of this type, according to which a predetermined amount of a plastic melt is fed into a mold cavity of a mold via a sprue channel, with at least a part of the amount first fed into a reserve cavity located in the mold and then transferred into the mold cavity. The volume of the reserve cavity can hereby be approximately the same as or smaller than the volume of the predetermined quantity of melt. This known process is performed by means of the device described. This device has a mold with a mold cavity, an injection unit which can be attached to the mold, and at least one channel which connects the mold cavity with the available injection unit. Furthermore, the mold has a reserve cavity which is connected with the channel and which is provided with means for transfer of the melt from the reserve cavity into the mold cavity.

In a version characterized as preferred, the reserve cavity is implemented as a cylindrical boring and the transfer means is implemented as a piston which is axially displaceable in the cylinder, with the transfer of the melt from the reserve cavity into the mold cavity performed by application of a force to the piston, with the force exercised by a pressure spring or an adjustable pressure cylinder with a second piston.

This known solution has the disadvantage that a not insignificant amount of the molding material melt reaches the form cavity at high pressure directly from the injection cylinder before the reserve cavity is filled, so that the molding material melt goes into the solidification phase at varying times. This, however, leads to structure faults in the workpiece. These type of structure faults do not have the same effect in the production of very flat workpieces, i.e. essentially two-dimensional workpieces such as smartcards or compact discs, as they do in the production of workpieces with complicated geometry.

Another technology is compression injection molding. In a publication of the firm Hoechst AG of Frankfurt am Main titled "Einführung in die Technologie der Kunststoffe. [Introduction into the Technology of Plastics]", Dipl.-Ing. Hans Domininghaus describes this process. To manufacture large-area injection molded parts which exceed the capacity of an injection molding machine, particularly in regard to closing and injection pressures, the mold is forced open a small amount by the effect of the injection pressure. After the entire volume has been injected, the full closing pressure is applied in a stamping stroke. The use of this procedure requires a plunger piston mold which sufficiently seals the inner cavity even if the mold halves are not completely closed. The advantageous effect consists of a better utilization of the machine and articles with lower stress due to the pressure dwell acting equally on the entire injection surface during production. The capacity range of an injection molding machine is increased and the quality of the articles is improved by means of an applied process in which the contraction compensation is performed by means of an elastic tie bar extension in the range of hundredths of a millimeter.

The known versions of compression injection molding processes have the disadvantage that the mold halves are completely closed only after the molding material has been injected, whereby an excess of molding material must be fed into the cavity, leading to mold mark formation on the crimping edges of the mold halves, so that costly mechanical post processing of the workpieces is necessary.

The fabrication of plastic semimanufactured products such as granulates or similar materials is performed by preparing a melt and then pressing it in a mold at high-pressure, cooling the mass, and ejecting the molded part after the mold is opened. The pressures required for this are an important criterion for the constructive implementation of the machines and molds, above all in regard to the locking pressures obtaining. Therefore, injection molding technology has very high demands in this connection if surface-structured workpieces, such as those which require sharp-edged filling, are to be manufactured.

An injection molding machine for the processing of thermoplastics is known from the German disclosure document 11 74 491, according to which the injection materials are not fed directly from an injection nozzle attached to an extruder into a mold, but rather by means of a cylinder in which a piston is positioned so that it is translationally movable in order to form a repository for the injection material, which is emptied by means of the piston into the mold. For this purpose, the piston has a channel whose outlet is implemented as a nozzle and which corresponds with a sprue boring in the mold. The piston is suspended via cables running over rollers from a yoke rigidly attached to the extruder outlet, with counterweights located on the free cable ends. The piston stroke occurs when the mold is pressed against the piston and displaces it in the cylinder until the cylinder is emptied through the piston channel into the mold, which corresponds via the sprue boring. The counterweights hereby have the purpose of reducing the process pressures.

This known injection molding machine has the disadvantage that the emptying of the repository occurs via a very narrow path consisting of the piston channel terminated by a nozzle and the corresponding sprue boring, and therefore high process pressures must be applied, which must in turn be reduced by use of the potential energy: of the counterweights. A further disadvantage is the technological expense of mechanically removing the sprue slugs of the injection molded parts produced.

Providing an accommodation space into which the melt is fed and then pressed by means of a plunger into the mold cavity, in order to be able to produce the variety of forms of injection molding technology as well as larger volumes and formats than in injection molding by reduction of the operating pressures, is known from the publication of the international application WO 98/09768, which is based on the priority of the South African applications 96/7509 and 97/4923. The known device for production of molded parts comprises a transfer unit which includes an accommodation space for accommodation of a batch of molding material. The molding material reaches a tube in a granulated or molten state through a heated passage by means of a supply spindle and is then displaced by means of plunger into the accommodation space. The transfer unit is then brought into a second position in which the accommodation space aligns with an opening in a mold plate. The opening is connected with an injection cavity in the shape of the molded part to be produced. In this position, the transfer unit displaces the batch of molten molding material via a second plunger out of the accommodation space through the opening in the injection cavity. In the filling position, the accommodation space is open on one side, so that the first plunger can push in the molding material. In the emptying position, the accommodation space is open on two sides, so that the displacement plunger can enter and the molding material can exit the accommodation space. The change of position of the transfer unit from the filling position to the emptying position can occur as a translation or as a rotation, like a two-way valve.

This known device has the disadvantage that the transfer unit is displaced by means of a special drive, which results in a significant expense for design and control technology.

The solution according to the international application WO 98/09768 represents the most advanced prior art, and the invention will therefore be delimited from this solution.

The object of the invention is to improve the compression injection molding process of the type described in such a way that structure faults are prevented and the expenditure for the mechanical post processing of the workpieces is minimized, as well as reducing the expense for design and control technology in molding devices with predosing of the molding materials for reduction of the work pressure.

The object is achieved according to the invention by feeding the molten molding material into a repository space, whose volume corresponds almost exactly with the volume of the mold cavity, before molding in a mold cavity, with the repository space implemented as a cylinder and connected so that it communicates with the mold cavity in such a way that the repository space discharges without transition into the mold cavity, and the molding material is conveyed out of the repository space into the mold cavity by means of a piston which is axially displaceable in the repository space. At the beginning of the injection process, the piston is at a first dead center, in which the bottom of the piston aligns with the edge of the repository space and with the wall of the mold cavity in such a way that a small amount of molding material melt reaches the mold cavity directly. The piston then slides into the cylinder. The repository space, which becomes larger continuously, is hereby filled with molding material melt at almost no pressure in such a way that the molding material melt is always conveyed into the plastic core until the piston reaches its second dead center position. At this time, the supply of the molding material melt is ended. The piston is then moved to just before its first dead center position and the mold cavity is thus completely filled with molding material. For contraction compensation, the piston is brought into the first dead center position during the dwell time.

The invention is advantageously developed if the discharge of the molding material from the repository space into the mold cavity is performed in such a way that the movement speed is reduced as the movement path of the piston from the second dead center position to shortly before the first at center position increases.

It is also advantageous for the maximum volume of the repository space to be slightly larger than the volume of the mold cavity, whereby the contraction compensation can be performed through supplementary displacement of molding material from the repository space.

The invention can be advantageously embodied by having the molding material melt reach the repository space through a channel which runs inside the piston and discharges in the bottom of the piston.

The molding process according to the invention is characterized in that the filling of the repository space occurs with almost no pressure. The volume of the repository space corresponds at all times with the volume of the injected molding material, so that the melt remains free of air inclusions. Because the molding material is always injected into the plastic core of the melt in the repository space, the occurrence of joint lines and of a free jet, whose quick cooling, which is particularly perceptible on the walls of the mold cavity and the repository space, leads to structure disturbances, is prevented. Attended by the reduction of the movement of the piston during the transfer of the molding material from the repository space into the mold cavity, as well as the contraction compensation during the dwell time by the supplementary displacement of molding material from the repository space into the mold cavity at high pressure, the finished workpiece has a homogenous structure. Because the mold halves remain closed during the entire molding process, crimping edges are superfluous, so that no mold lines can occur.

To perform the process according to the invention, a device is suggested which is implemented as a dosing device on molding machines with a molding material preparation device and a mold cavity. The mold cavity is formed by means of a first and a second molding plate and filled with molding material. The outlet of the molding material preparation device is connected with an accommodation space, whose volume can be changed, which is in turn connected by means of an opening with the mold cavity. The accommodation space is in a bushing between the face of a plunger, which is translationally movable in the bushing, and the mold cavity. When the plunger assumes the rear end position, the accommodation space has a volume which is at least as large as the volume of the mold cavity. The plunger serves for displacement of the molding material from the accommodation space into the mold cavity. When the plunger assumes a forward position, its face is flush with the edge of the opening. The plunger is rigidly mechanically connected with the molding material preparation device and provided with a channel into which the outlet of the molding material preparation device discharges. The bushing is implemented as a component of the first mold plate and has a first opening available, which the plunger dips into, and a second opening, which is located opposite to the first opening. The second opening forms the connection with the mold cavity in such a way that the bushing discharges into the mold cavity without narrowing. The plunger is provided with a stop which presses against the edge surrounding the first opening of the bushing in the forward end position of the plunger.

The device according to the invention is further developed by providing multiple bushings and an equal number of plungers. The plungers are attached to a hot runner girder which is connected with the molding material preparation device and has at least one hot runner into which the outlet of the molding material preparation device discharges. The channels of the plungers are connected with the hot runner. The hot runner girder forms the stop for ending the relative motion between the plunger and the bushing.

Advantageous implementations of the device according to the invention are described in the sub-claims.

Due to the connection with the outlet of the molding material preparation device, the plunger is in the rear position when the molding material preparation device is in the position away from the mold. In this rear position of the plunger, the accommodation space is opened and filled with molding material. As the molding material preparation device is pushed forward, the plunger is translationally moved from the rear position into the bushing in the direction of the mold cavity, whereby the volume of the accommodation space is reduced and the molding material is pressed out of the accommodation space through the second opening of the bushing into the mold cavity. The pressure required for this is reduced to less than 30% of the pressure to be used in current injection molding technology, so that, on one hand, smaller molding material preparation devices are usable and, on the other hand, a correspondingly lower expenditure has to be made in regard to the stability of the mold surrounding the mold cavity, and therefore its structure and complexity can be designed within wider limits. After the forward end position of the plunger, which is determined by means of the stop of the plunger at the edge of the first opening of the bushing, has been reached, the volume of the accommodation space is at a minimum. The batch of molding material is completely in the mold cavity, so that the cooling of the molding material and then the ejection of the workpiece occurs.

To maintain or to achieve a suitable consistency of the molding material, the channel in the plunger and/or the accommodation space is advantageously heated, as long as the molding material has not been completely fed into the mold cavity.

A heat exchanger, which is connected to a cooling circuit and is advantageously positioned as a hollow cylinder between the heater and the surface shell of the plunger, serves according to the invention for cooling of the plunger in the bushing. The cooling is advantageously performed by means of the fluid flowing in the cooling circuit, with the cooling circuit able to be equipped with a control system.

The cooling of the second mold plate provided according to the invention improves the dimensional stability of the mold cavity and thereby the quality of the workpiece to be molded, particularly its surface. The planar heat exchanger preferably located in the second mold plate opposite the second opening of the bushing can be connected to the same cooling circuit as the heat exchanger found in the plunger.

The dosing device according to the invention is characterized by rapid dissipation of the heat arising, in that at least the face of the plunger and/or the region of the second mold plate lying opposite the second bushing opening has good thermal conductivity and is thermally coupled with the heat exchangers.

The further development of the invention in the form of multiple bushings and plungers is characterized by an analogous mode of operation. By means of the relative motion between the plungers and the bushings, the faces of the plungers move from the rear position up to the border of the mold cavity, whereby the volume of the accommodation space is reduced and the molding material is pressed out of the accommodation space through the second opening of the bushing into the mold cavity. After the forward end position of the bushing has been reached, the volume of the accommodation room is at a minimum. The batch of molding material is completely in the mold cavity, so that the cooling of the molding material and then the ejection of the workpiece occurs. The relative motion between the plungers and bushings can be realized both through movement of the plungers attached to the hot runner girder, for example by use of the forward displacement of the molding material preparation device, and through movement of the mold plate unit forming the mold cavity and having the bushings, for example through appropriate development of the ejection drive.

The heating of the hot runner girder ensures a flow of the molding material which is appropriate for the process. Of course, the individual accommodation spaces can hereby have varying volumes.

Figure 2:
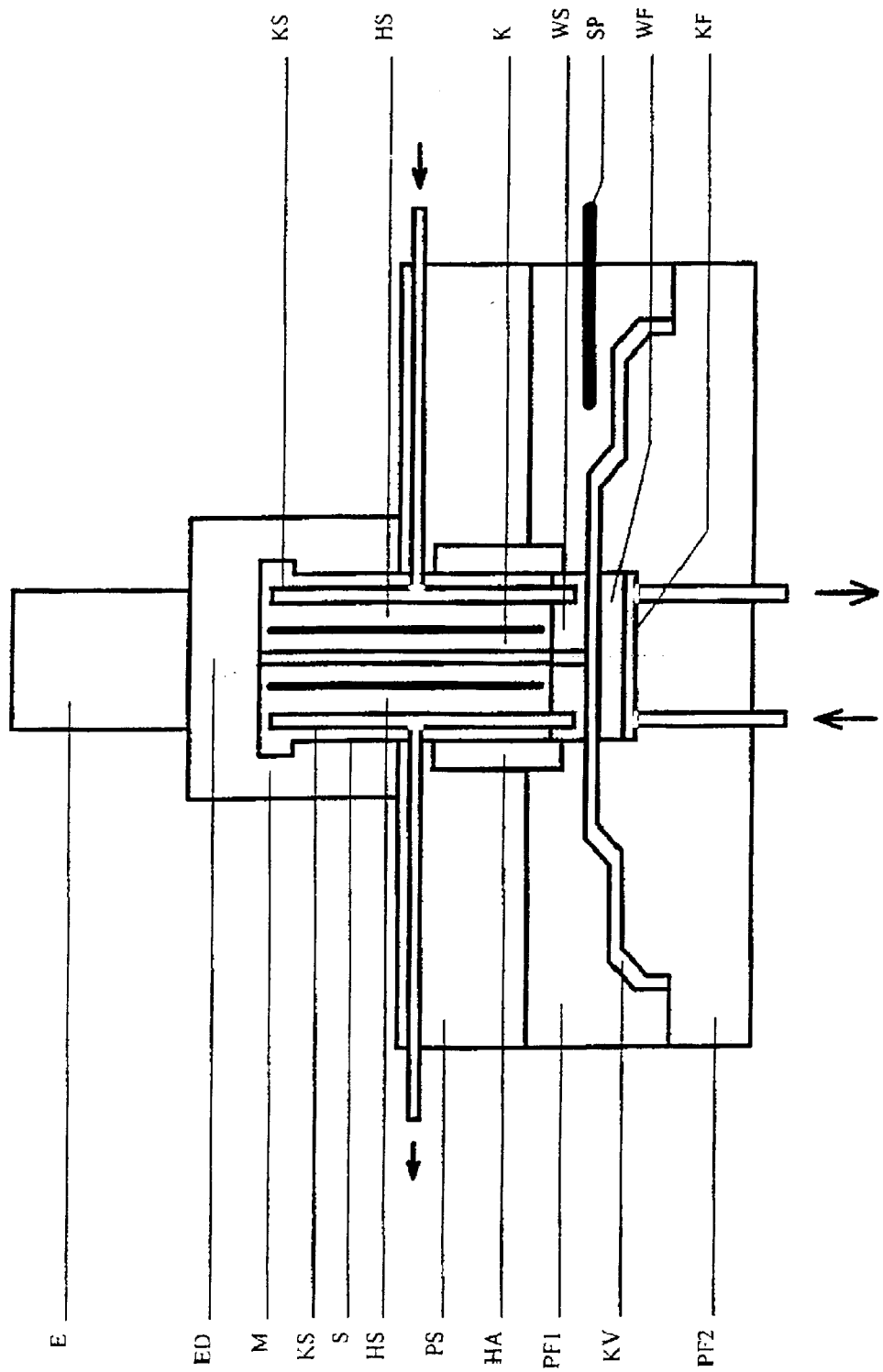

In the following, the invention will be described in more detail in the form of a preferred exemplary embodiment with reference to the drawings. The drawings show:

FIG. 1 a device according to the invention during the dosing phase,

FIG. 2 a device according to the invention after molding is complete, and

Figure 3:
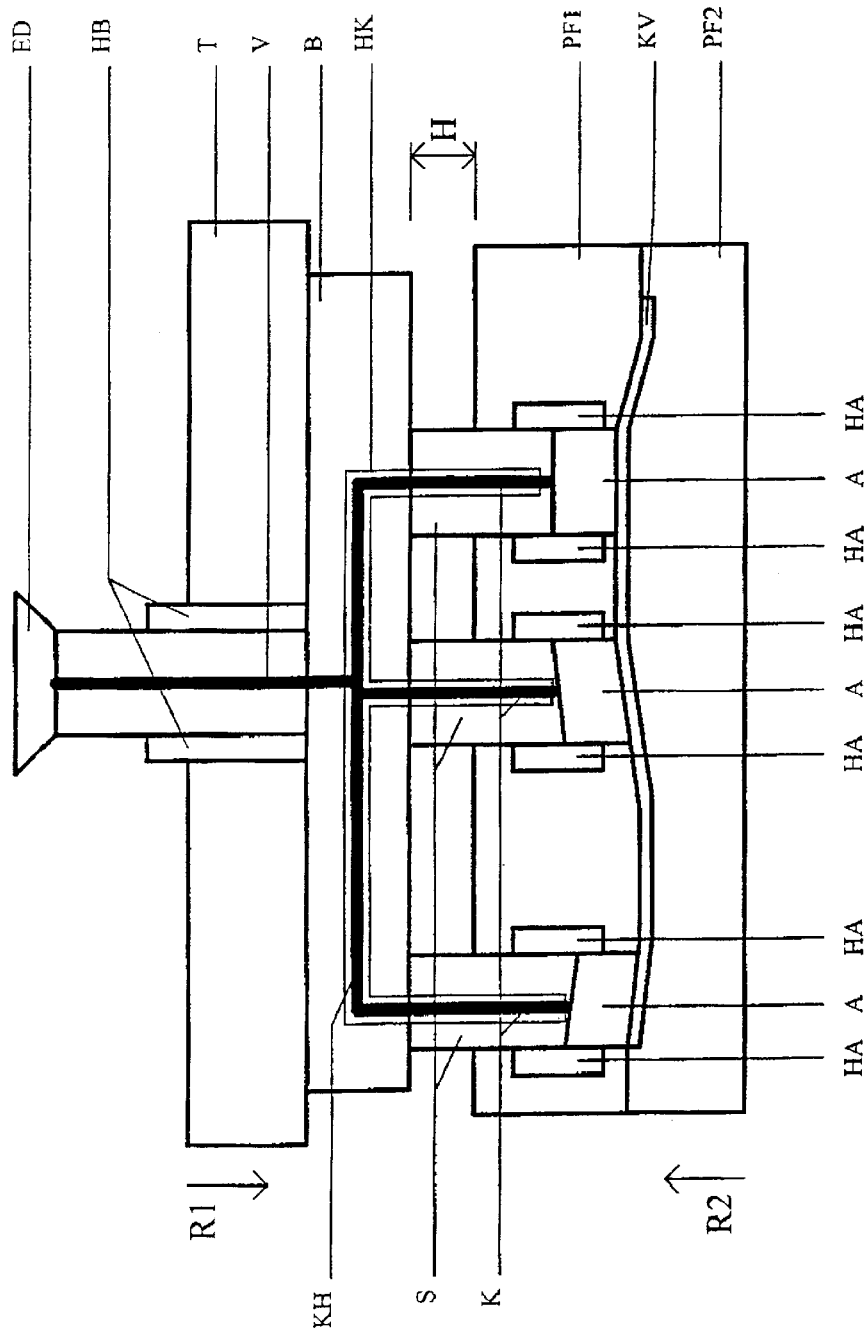

FIG. 3 a further development of the device according to the invention during the dosing phase.

The illustration in FIG. 1 shows an extruder outlet E with an extruder nozzle ED. A plunger S is rigidly attached to the extruder outlet E by means of a union nut M. The plunger S dips into a first opening of a bushing which is embedded in a mold consisting of a first mold plate PF1 and a second mold plate PF2, as well as a mold clamping plate PS. The face of the plunger S found in the bushing consists of thermally conducting material WS. A mold cavity KV forming the shape of the workpiece, which is connected with the second opening of the bushing, is illustrated between the first mold plate PF1 and the second mold plate PF2. The plunger S has a channel K available, into which the extruder nozzle ED discharges and whose: outlet is provided in the face of the plunger S. The channel K is surrounded over almost its entire length by a preferably adjustable heater HS. A fluid heat exchanger KS which is connected with a cooling circuit is located between the heater HS and the external surface shell of the plunger. Opposite the second opening of the bushing, the second mold plate PF2 and the face of the plunger S consist of thermally conducting material WF which is in the thermal contact with a fluid heat exchanger KF connected with the cooling circuit mentioned in connection with the cooling of the plunger S. Because the extruder outlet E, and therefore the plunger S, assume a rear position, an accommodation space A is opened in the bushing between the face of the plunger S and the mold cavity KV. The opening connecting the accommodation space A with the mold cavity KV is closed by means of a slider SP. An adjustable heater HA implemented as a band is located in the bushing wall in the region of the accommodation space A.

FIG. 2 shows the dosing device according to the invention after molding is complete. The difference from the dosing phase according to FIG. 1 is that the plunger S assumes a forward position. The forward position of the plunger S is defined by means of the stop formed by the union nut M on the mold clamping plate PS. In the forward position, the face of the plunger S aligns with the second opening of the bushing and thereby with the mold cavity KV, with the slider SP drawn back, so that the accommodation space A is removed and the molding material instead fills up the mold cavity KV. An improvement of the ability of the plunger S to slide in the bushing can be achieved by a slight axial offset of the plunger S, which is compensated for by means of the union nut M. The plunger S is cooled by the flow of the coolant through the heat exchanger KS. The cooling of the plunger S has, in combination with the cooling of the second mold plate PF2 in the region opposite the second opening of the bushing by means of a heat exchanger KF with coolant flowing through it, the consequence of withdrawing heat from the molding material and thereby accelerating the cooling of the workpiece. The cooling process is particularly effective due to the good thermal conductivity of the regions WS and WF.

The illustration according to FIG. 3 contains a further development of the device according to the invention, according to which a number of repository spaces A and equal number of pistons S are provided. A carrier T is attached to an extruder nozzle ED. A hot runner girder B is connected to the carrier T, to which, in turn, a number of plungers S are affixed. A connection channel V leads from the extruder nozzle ED to a hot runner H located in the hot runner girder B. The channels K of the plungers S are connected to the hot runner KH. The extruder nozzle ED is surrounded by a heating band HB, which is implemented as adjustable. The hot runner KH and the channels K of the plungers S are allocated an adjustable channel heater HK. An injection mold consisting of a first mold plate PF1 and a second mold plate PF2 is opposite this layout. The mold plates PF1 and PF2 enclose a mold cavity KV which forms the negative of the workpiece to be manufactured. There are a number of bushings in the first mold plate PF1 into which the plungers S dip, with accommodation spaces A opened between the free faces of the plungers S and the bushing openings transitioning into the mold cavity KV. Accommodation space heaters HA which enclose the accommodation spaces A are integrated in the first mold plate PF1.

The molding material goes from the extruder nozzle ED through the connection channel V into the hot runner KH. The hot runner KH serves for distribution of the molding material into the channels K of the plungers S, from which the molding material is pressed into the accommodation spaces A. After filling of the accommodation spaces A, the dosing phase is completed. Through a first translation R1, which represents a forward displacement movement of the extruder nozzle ED and the components connected with it—the carrier T, the hot runner girder KH, and the plunger S —in the direction of the mold consisting of the mold plates PF1 and PF2, or a second translation R2, which represents a forward displacement movement of the mold consisting of the mold plates PF1 and PF2 in the direction of the extruder nozzle ED and the components connected with it—the carrier T, the hot runner girder KH, and the plunger S—the molding material is pushed out of the accommodation spaces A by means of the faces of the plungers S sliding from then on in the bushings into the mold cavity KV until the hot runner girder B and the face of the mold plate PF1 turned towards it contact one another after completion of a stroke H. The volumes of the accommodation spaces A can differ from one another, as the faces of the plungers S can be implemented differently, because the molding material is dosed for different regions of the mold cavity KV in the individual accommodation spaces A. After the molding material solidifies, the finished workpiece is ejected in a known way by separating the mold plates PF1 and PF2 from one another. Cooling devices and heat dissipation regions can be advantageously provided in order to accelerate the cooling of the workpiece and thereby shorten the production time.

The exemplary embodiments described represent advantageous forms of the invention. Of course, any combination of characteristics of the exemplary embodiments with one another is included by the invention.

What is claimed is:

1. Molding process for the production of plastic parts in which the molten molding material is fed, before molding in a mold cavity (KV), into a repository space (A), implemented as a cylinder and communicating with the mold cavity (KV) in such a way that the repository space (A) discharges without transition into the mold cavity (KV), whose volume nearly corresponds with the volume of the mold cavity (KV), and the molding material is conveyed out of the repository space (A) into the mold cavity (KV) by means of a piston (S) which is axially displaceable in the repository space (A), characterized in that at the beginning of the injection process, the piston (S) is at a first dead center, at which the bottom of the piston aligns with the edge of the repository space (A) and with the wall of the mold cavity in such a way that a small amount of molding material melt reaches the mold cavity (KV) directly, the piston (S) then slides into the cylinder and the repository space (A), which becomes larger continuously, is filled with molding material melt at almost no pressure until the piston (S) reaches its second dead center position and the supply of the molding material melt is ended, the piston (S) is then moved almost to the first dead center position and the mold cavity (KV) is thus completely filled with molding material, and during the dwell time, the piston (S) is brought into the first dead center position.

2. Molding process according to claim 1, characterized in that as the movement path of the piston (S) from the second dead center position to shortly before the first dead center position increases, its movement speed decreases.

3. Molding process according to claim 1, characterized in that the maximum volume of the repository space (A) is slightly larger than the volume of the mold cavity (KV).

4. Molding process according to claim 1, characterized in that the molding material melt reaches the repository space (A) through a channel (K) running through the inside of the piston (S) and discharging in the bottom of the piston.

5. Dosing device for molding machines having a molding material preparation device and a mold cavity (KV), formed by means of a first and a second mold plate (PF1, PF2), which is filled up with molding material, with the outlet (E) of the molding material preparation device connected with an accommodation space (A) whose volume can be changed and whose largest volume corresponds to at least volume of the mold cavity (KV), the accommodation space (A) connected by means of the opening with the mold cavity (KV) and occurring in a bushing between the face of a plunger (S), which is translationally movable in the bushing to serve for displacement of the molding material out of the accommodation space (A) into the mold cavity (KV) and provided with a through channel (K) for filling of the accommodation space (A), and the mold cavity (KV) when the plunger (S) assumes a rear position, and the face of the plunger (S) is flush with the edge of the opening when the plunger (S) assumes a forward position, characterized in that the plunger (S) is rigidly mechanically connected with the molding material preparation device (E), the bushing implemented as a component of the first molding plate (PF1) available a first opening into which the plunger (S) dips and a second opening located opposite to the first opening and directly connected with the mold cavity (KV), and the plunger (S) is provided with a stop (M) which presses against the edge surrounding the first opening of the bushing in the forward position of the plunger (S).

6. Dosing device according to claims 5, characterized in that the plunger (S) consists of thermally conducting material (WS) on at least its free end.

7. Dosing device according to claim 5, characterized in that the plunger is provided with a heat exchanger (KS) which is connected into a cooling circuit.

8. Dosing device according to claim 7, characterized in that the heat exchanger (KS) is thermally coupled with at least the face of the plunger (S).

9. Dosing device according to claim 7, characterized in that the cooling circuit with the connected heat exchanger (KS) is implemented as adjustable.

10. Dosing device according to claim 5, characterized in that the second mold plate (PF2) consists of thermally conductive material (WF) in at least the region lying opposite to the second opening of the bushing.

11. Dosing device according to claim 5, characterized in that the second mold plate (PF2) is provided with a heat exchanger (KF) connected into a cooling circuit.

12. Dosing device according to claims 11, characterized in that the heat exchanger (KF) is thermally coupled with the region of the second mold plate (PF2) consisting of thermally conductive material (WF).

13. Dosing device according to claim 11, characterized in that the cooling circuit with the connected heat exchanger (KF) is implemented as adjustable.

14. Dosing device according to claims 5, characterized in that a union nut with a shank, which is screwed on to the outlet (ED) of the molding material preparation device (A), serves as the stop (M) of the plunger (S).

15. Dosing device according to claim 5, characterized in that the second opening of the bushing is closed mechanically when the plunger (S) assumes the rear end position.

16. Dosing device according to claim 5, characterized in that a number of bushings and an equal number of plungers (S) are provided, the plungers (S) are attached to a hot runner girder (B), the hot runner girder (B) is connected with the molding material preparation device, the hot runner girder (B) has at least one hot runner (H) into which the outlet (ED) of the molding material preparation device discharges, the channels (K) of the plungers (S) are connected with the hot runner (KH), and the hot runner girder (B) forms the stop for ending of the relative motion between the plungers (S) and the bushings.

17. Dosing device according to claim 16, characterized in that a hot runner (KH) is provided with a number of outlets, which discharge into the plunger channels (K), corresponding to the number of plungers (S) and bushings.

18. Dosing device according to claim 16, characterized in that a number of hot runners (KH), positioned in a star shape, which corresponds to the number of the plungers (S) and bushings, connect the discharge of the outlet (ED) of the molding material preparation device with the plunger channels (K).

19. Dosing device according to claim 16, characterized in that the hot runner girder (B) is provided with a heating device (HK).

20. Dosing device according to claim 19, characterized in that the heating device (HK) is adjustable.

* * * * *

UNITED STATES PATENT AND TRADEMARK OFFICE
CERTIFICATE OF CORRECTION

PATENT NO. : 6,699,422 B1
DATED : March 2, 2004
INVENTOR(S) : Stemke

It is certified that error appears in the above-identified patent and that said Letters Patent is hereby corrected as shown below:

Column 9,
Line 3, after "(PF1)" please insert the word -- has --.
Line 10, "claims" should be -- claim --.
Line 29, "claims" should be -- claim --.

Column 10,
Line 1, "claims" should be -- claim --.

Signed and Sealed this

Twenty-fifth Day of May, 2004

JON W. DUDAS
*Acting Director of the United States Patent and Trademark Office*